United States Patent
Park et al.

(10) Patent No.: US 12,217,914 B2
(45) Date of Patent: Feb. 4, 2025

(54) CERAMIC ELECTRONIC COMPONENT WITH OPENINGS IN ELECTRODE

(71) Applicant: SAMSUNG ELECTRO-MECHANICS CO., LTD., Suwon-si (KR)

(72) Inventors: Seung Hyun Park, Suwon-si (KR); Jin Mo Ahn, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 247 days.

(21) Appl. No.: 17/725,162

(22) Filed: Apr. 20, 2022

(65) Prior Publication Data

US 2023/0215651 A1  Jul. 6, 2023

(30) Foreign Application Priority Data

Dec. 30, 2021  (KR) ........................ 10-2021-0192315

(51) Int. Cl.
  *H01G 4/30* (2006.01)
  *H01G 4/012* (2006.01)
  *H01G 4/12* (2006.01)

(52) U.S. Cl.
  CPC .............. *H01G 4/30* (2013.01); *H01G 4/012* (2013.01); *H01G 4/1209* (2013.01)

(58) Field of Classification Search
  None
  See application file for complete search history.

(56) References Cited

U.S. PATENT DOCUMENTS

| | | | | |
|---|---|---|---|---|
| 2,939,059 | A | * | 5/1960 | Gravley ................ C04B 35/468 361/308.1 |
| 3,635,759 | A | * | 1/1972 | Howatt .................... H01G 4/30 29/25.42 |
| 10,062,506 | B2 | * | 8/2018 | Choi ........................ H01G 4/30 |

(Continued)

FOREIGN PATENT DOCUMENTS

| | | | | |
|---|---|---|---|---|
| CN | 103168332 A | * | 6/2013 | ............... H01G 4/12 |
| CN | 103996535 B | * | 7/2017 | ............. H01G 4/008 |

(Continued)

OTHER PUBLICATIONS

KR20180035169_Original_Translation (Year: 2018).*

*Primary Examiner* — Timothy J. Dole
*Assistant Examiner* — Muhammed Azam
(74) *Attorney, Agent, or Firm* — MORGAN, LEWIS & BOCKIUS LLP (57) ABSTRACT

A ceramic electronic component includes a body including a dielectric layer and a plurality of internal electrodes stacked in a first direction with the dielectric layer interposed therebetween and including first and second surfaces opposing each other in the first direction and side surfaces connected to the first and second surfaces, an external electrode disposed on one of the side surfaces of the body extending onto a portion of the first surface of the body, and an insulating layer covering a surface of the external electrode and including a plurality of openings exposing the external electrode, wherein a ratio of an area of the plurality of openings to an area of the surface of the external electrode covered by the insulating layer is 20% to 70%.

20 Claims, 6 Drawing Sheets

(56) References Cited

U.S. PATENT DOCUMENTS

| | | | |
|---|---|---|---|
| 10,062,511 B1* | 8/2018 | Park | H05K 1/111 |
| 10,192,686 B1* | 1/2019 | Park | H01G 2/06 |
| 10,366,834 B1* | 7/2019 | Lee | H01G 4/012 |
| 11,183,332 B2* | 11/2021 | Kim | H01G 4/2325 |
| 11,749,459 B2* | 9/2023 | Lee | H01G 4/232 361/301.4 |
| 2004/0084131 A1* | 5/2004 | Konoue | H01F 41/046 156/89.12 |
| 2010/0079925 A1* | 4/2010 | Togashi | H01G 4/30 361/306.3 |
| 2011/0170234 A1* | 7/2011 | Lee | H01G 11/12 361/502 |
| 2012/0320496 A1* | 12/2012 | Shin | H01G 4/005 361/321.2 |
| 2013/0094121 A1* | 4/2013 | Endo | H01G 4/1209 361/305 |
| 2013/0189602 A1* | 7/2013 | Lahiri | H01G 4/015 977/762 |
| 2016/0196922 A1* | 7/2016 | Omori | H01G 4/008 361/301.4 |
| 2017/0323725 A1* | 11/2017 | Iso | H01F 27/292 |
| 2018/0294102 A1* | 10/2018 | Trinh | H01G 4/30 |
| 2019/0156988 A1* | 5/2019 | Nakamura | H01F 27/2804 |
| 2019/0237252 A1* | 8/2019 | Jang | H01L 28/90 |
| 2019/0385795 A1* | 12/2019 | Yang | H01G 4/30 |
| 2020/0211774 A1* | 7/2020 | Onodera | H01G 4/248 |
| 2020/0365326 A1* | 11/2020 | Masunari | H01G 2/065 |
| 2021/0043378 A1* | 2/2021 | Nagai | H01G 4/2325 |
| 2021/0082622 A1* | 3/2021 | Kim | H01G 4/30 |
| 2021/0375546 A1* | 12/2021 | Yang | H01G 4/248 |
| 2022/0301780 A1* | 9/2022 | Yokomizo | H01G 4/008 |
| 2023/0215651 A1* | 7/2023 | Park | H01G 4/30 361/321.2 |
| 2023/0230773 A1* | 7/2023 | Yoshioka | H01G 4/30 361/301.4 |

FOREIGN PATENT DOCUMENTS

| | | | | |
|---|---|---|---|---|
| CN | 109644556 A | * | 4/2019 | B32B 18/00 |
| CN | 106373779 B | * | 11/2019 | H01G 4/005 |
| JP | 6547762 B2 | | 7/2019 | |
| JP | 2020-188144 A | | 11/2020 | |
| KR | 10-2019-0121173 A | | 10/2019 | |
| KR | 10-2142518 B1 | | 8/2020 | |
| KR | 20210114531 A | * | 9/2021 | |
| KR | 20230048436 A | * | 4/2023 | |

* cited by examiner

CERAMIC ELECTRONIC COMPONENT WITH OPENINGS IN ELECTRODE

CROSS-REFERENCE TO RELATED APPLICATION

This application claims benefit of priority to Korean Patent Application No. 10-2021-0192315 filed on Dec. 30, 2021 in the Korean Intellectual Property Office, the disclosure of which is incorporated herein by reference in its entirety.

BACKGROUND

1. Field

The present disclosure relates to a ceramic electronic component.

2. Description of Related Art

Multilayer ceramic capacitors, among ceramic electronic components, may be mounted on a printed circuit board (PCB) and used. At this time, due to a difference in the coefficient of thermal expansion between the multilayer ceramic capacitor and the PCB, repeated deformation may occur at a contact surface between the multilayer ceramic capacitor and the PCB according to a change in operating temperature to cause cracks in a ceramic body.

In order to solve this problem, in the related art, an insulating layer is disposed on a lower surface of the multilayer ceramic capacitor. Thereby, crack occurrence is prevented and bending strength of the multilayer ceramic capacitor is improved.

However, the insulating layer may be formed on the lower surface of the multilayer ceramic capacitor in contact with the PCB, a conductive adhesive such as solder connecting the multilayer ceramic capacitor and the PCB and external electrodes cannot be connected through the lower surface of the multilayer ceramic capacitor.

As a result, adhesive strength between the multilayer ceramic capacitor and the PCB is lowered, so that the multilayer ceramic capacitor is detached from the PCB due to an external impact. In addition, the conductive adhesive is only connected to a side surface of the external electrodes due to the insulating layer formed on the lower surface of the multilayer ceramic capacitor, a length of a current path is increased, thereby increasing ESL.

SUMMARY

An aspect of the present disclosure may provide a ceramic electronic component preventing cracks that may occur during substrate mounting and having excellent bending strength.

An aspect of the present disclosure may also provide a ceramic electronic component having excellent adhesive strength with a substrate.

An aspect of the present disclosure may also provide a ceramic electronic component having excellent ESL characteristics by reducing a length of a current path.

According to an aspect of the present disclosure, a ceramic electronic component may include: a body including a dielectric layer and a plurality of internal electrodes stacked in a first direction with the dielectric layer interposed therebetween and including first and second surfaces opposing each other in the first direction and side surfaces connected to the first and second surfaces; an external electrode disposed on one of the side surfaces of the body and extending onto a portion of the first surface of the body; and an insulating layer covering a surface of the external electrode and including a plurality of openings exposing the external electrode. A ratio of an area of the plurality of openings to an area of the surface of the external electrode covered by the insulating layer is 20% to 70%.

The insulating layer may cover the first surface of the body and the external electrode extending onto the portion of the first surface of the body.

The external electrode may include first and second external electrodes disposed on both side surfaces of the body opposing each other, and the insulating layer may cover each of the first and second external electrodes extending onto a portion of the first surface of the body.

The external electrode may include a first electrode layer disposed on the body and including a conductive metal and glass, a second electrode layer disposed on the first electrode layer and including a conductive metal and a resin, and a third electrode layer disposed on the second electrode layer and including a conductive metal.

The conductive metal of the first electrode layer may include copper (Cu) or nickel (Ni), the conductive metal of the second electrode layer may include copper (Cu) or nickel (Ni), and the resin of the second electrode layer may include an epoxy resin.

The third electrode layer may have a multilayer structure including a first layer including nickel (Ni) as a conductive metal and a second layer including tin (Sn) as a conductive metal.

The insulating layer may include at least one of a resin or a ceramic.

The resin may include at least one of an epoxy resin, a silicon resin, a fluoro resin, a phenol resin, a urea resin, a melamine resin, or an unsaturated polyester resin.

The ceramic may include at least one of lead zirconate titanate, alumina, silica, silicon carbide, or magnesium oxide.

The ceramic electronic component may further include an additional insulating layer covering the second surface of the body and each of the first and second external electrodes extending onto a portion of the second surface of the body.

According to another aspect of the present disclosure, a ceramic electronic component may include: a body including a dielectric layer and a plurality of internal electrodes stacked in a first direction with the dielectric layer interposed therebetween and including first and second surfaces opposing each other in the first direction and side surfaces connected to the first and second surfaces; first and second external electrodes respectively disposed on both of the side surfaces of the body opposing each other; and an insulating layer covering the first surface of the body, the first external electrode extending onto a portion of the first surface of the body, and the second external electrode extending onto another portion of the first surface of the body, wherein the insulating layer includes a plurality of openings exposing the first and second external electrodes.

According to still another aspect of the present disclosure, a ceramic electronic component may include: a body including a dielectric layer and a plurality of internal electrodes stacked in a first direction with the dielectric layer interposed therebetween and including first and second surfaces opposing each other in the first direction and side surfaces connected to the first and second surfaces; an external electrode including a connection portion disposed on one of the side surfaces of the body and a band portion extending from the connection portion onto a portion of the first surface of the body; and an insulating layer disposed on the first surface of the body and extending onto a portion of the band portion of the external electrode, the insulating layer including at least one opening exposing the portion of the band portion.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

In the drawing, a first direction may be defined as a thickness (T) direction, a second direction may be defined as a length (L) direction, and a third direction may be defined as a width (W) direction.

Referring to FIGS. 1 to 6, a ceramic electronic component 100 may include a body 110 including a dielectric layer 111 and a plurality of internal electrodes 121 and 122 stacked in a first direction with the dielectric layer therebetween and including first and second surfaces opposing each other in the first direction and side surfaces connected to the first and second surfaces, external electrodes 131 and 132 disposed on the side surface of the body 110, and an insulating layer 150 covering surfaces of the external electrodes 131 and 132 and including a plurality of openings H1 and H2 exposing the external electrodes 131 and 132, wherein a ratio of an area of the plurality of openings H1 and H2 to an area of the surfaces of the external electrodes 131 and 132 covered by the insulating layer 150 20% to 70%.

As described above, when an insulating layer is disposed on the lower surface to prevent an occurrence of cracks of the ceramic electronic component and improve bending strength, a conductive adhesive such as solder and the external electrode of the ceramic electronic component may not be connected through the lower surface of the ceramic electronic component, causing a problem in that adhesive strength between the ceramic electronic component and the PCB is lowered. In addition, since the conductive adhesive is connected only to the side surface of the external electrode due to the insulating layer formed on the lower surface of the ceramic electronic component, a length of a current path is increased, resulting in an increase in ESL.

Meanwhile, in the ceramic electronic component 100 according to an exemplary embodiment in the present disclosure, the insulating layer 150 is formed on the lower surface of the body 110 to improve bending strength, while the insulating layer 150 including a predetermined amount of the plurality of openings H1 and H2 exposes the external electrodes 131 and 132, thereby improving adhesive strength and reducing ESL.

Hereinafter, each component included in the ceramic electronic component 100 according to an exemplary embodiment in the present disclosure will be described in more detail.

There is no particular limitation on a specific shape of the body 110, but as shown, the body 110 may have a hexahedral shape or a shape similar thereto. During a firing process, due to the shrinkage of the ceramic powder included in the body 110 or the polishing of the corners, the body 110 may not have a perfectly straight hexahedral shape but may have a substantially hexahedral shape.

The body 110 may include first and second surfaces 1 and 2 opposing each other in the first direction and side surfaces connected to the first and second surfaces 1 and 2, respectively. In this case, the side surfaces may include third and fourth surfaces 3 and 4 connected to the first and second surfaces and facing each other in the second direction and fifth and sixth surfaces 5 and 6 connected to the first to fourth surfaces and facing each other in the third direction.

In the body 110, the dielectric layer 111 and the internal electrodes 121 and 122 may be alternately stacked. A plurality of dielectric layers 111 forming the body 110 are in a sintered state, and adjacent dielectric layers 111 may be integrated such that boundaries therebetween may not be readily apparent without using a scanning electron microscope (SEM).

The dielectric layer 111 may be formed by sintering a ceramic green sheet including ceramic powder, an organic solvent, and a binder. The ceramic powder is not particularly limited as long as sufficient capacitance may be obtained therewith. For example, a barium titanate-based ($BaTiO_3$) material, a strontium titanate ($SrTiO_3$)-based material, etc. may be used, but the present disclosure is not limited thereto.

At this time, a thickness of the dielectric layer 111 may be 10 µm or less in consideration of a size and capacitance of the body 110, and may be preferably 0.6 µm or less, more preferably 0.4 µm or less for miniaturization and high capacitance of the ceramic electronic component 100, but the present disclosure is not limited thereto.

Here, the thickness of the dielectric layer 111 may refer to an average thickness of the dielectric layer 111 disposed between the internal electrodes 121 and 122. The average thickness of the dielectric layer 111 may be measured by scanning cross-sections of the body 110 in the first direction and the second direction with a scanning electron microscope having a magnification of 10,000. More specifically, the average value may be measured by measuring the thicknesses at a plurality of points of one dielectric layer 111, for example, at 30 points equally spaced in the second direction. In addition, when the average value is measured by extending the measurement of the average value to the plurality of dielectric layers 111, the average thickness of the dielectric layer 111 may be more generalized.

The body 110 may include a capacitance forming portion Ac forming capacitance by including a plurality of first internal electrodes 121 and a plurality of second internal electrodes 122 disposed to face each other with the dielectric layer 111 interposed therebetween, a first cover portion 112 disposed on an upper surface of the capacitance forming portion Ac and a second cover portion 113 disposed on a lower surface of the capacitance forming portion Ac. The first cover portion 112 and the second cover portion 113 may be formed by stacking a single dielectric layer or two or more dielectric layers on upper and lower surfaces of the capacitance forming portion Ac in the first direction, and may perform a function of basically preventing damage to the internal electrodes due to physical or chemical stress. The first and second cover portions 112 and 113 may have the same configuration as the dielectric layer 111 except that the first and second cover portions 112 and 113 do not include internal electrodes. Each of the first and second cover portions 112 and 113 may have a thickness of 20 μm or less, but the present disclosure is not limited thereto.

The body 110 may include margin portions 114 and 115 disposed on a side surface of the capacitance forming portion Ac in the third direction. The margin portions 114 and 115 may include a first margin portion 114 disposed on the fifth surface of the body 110 and a second margin portion 115 disposed on the sixth surface 6 of the body 110. The margin portions 114 and 115 may refer to a region between both ends of the internal electrodes 121 and 122 and a boundary surface of the body 110 in a cross-section of the body 110 cut in the first direction and the third direction. The margin portions 114 and 115 may basically serve to prevent damage to the internal electrodes 121 and 122 due to physical or chemical stress. The margin portions 114 and 115 may include the same or different material from the dielectric layer 111. The margin portions 114 and 115 may be formed by forming the internal electrodes by applying a conductive paste on the ceramic green sheet except for a portion in which the margin portion is to be formed. Alternatively, in order to suppress a step difference caused by the internal electrodes 121 and 122, the body 110 may be cut after stacking such that the internal electrodes 121 and 122 are exposed to the fifth and sixth surfaces 5 and 6 of the body, a single dielectric layer or two or more dielectric layers may be stacked on both side surfaces of the capacitance forming portion Ac in the third direction to form the margin portions 114 and 115. A thickness of the margin portions 114 and 115 may be 20 μm or less, but the present disclosure is not limited thereto.

The internal electrodes 121 and 122 may be alternately disposed with the dielectric layer 111, and the plurality of first internal electrodes 121 and the plurality of second internal electrodes 122 may be disposed to face each other with the dielectric layer 111 interposed therebetween. That is, the first and second internal electrodes 121 and 122 are a pair of electrodes having different polarities and may be formed to be alternately exposed through the third and fourth surfaces 3 and 4 of the body 110 in the stacking direction of the dielectric layer 111.

For example, each of the plurality of first internal electrodes 121 may be spaced apart from the fourth surface 4 and exposed through the third surface 3. In addition, each of the plurality of second internal electrodes 122 may be spaced apart from the third surface 3 and exposed through the fourth surface 4. The plurality of first internal electrodes 121 and the plurality of second internal electrodes 122 may be electrically separated from each other by the dielectric layer 111 disposed therebetween. The plurality of first internal electrodes 121 and the plurality of second internal electrodes 122 may be alternately stacked in the first direction, but are not limited thereto, and may be alternately stacked in the third direction.

The internal electrodes 121 and 122 may be formed by printing a conductive paste for internal electrodes including a conductive metal to have a predetermined thickness on a ceramic green sheet. When the ceramic green sheets on which the internal electrodes 121 and 122 are printed are alternately stacked and sintered, the capacitance forming portion Ac of the body 110 may be formed. As a method of printing the conductive paste for internal electrodes, a screen printing method or a gravure printing method may be used, but the present disclosure is not limited thereto.

The conductive metal included in the internal electrodes 121 and 122 may be one or more of nickel (Ni), copper (Cu), palladium (Pd), silver (Ag), gold (Au), platinum (Pt), tin (Sn), tungsten (W), titanium (Ti), and alloys thereof, but the present disclosure is not limited thereto.

In this case, a thickness of the internal electrodes 121 and 122 may be 10 μm or less in consideration of a size and capacitance of the body 110, and may be 0.6 μm or less, more preferably, 0.4 μm or less for miniaturization and high capacitance of the ceramic electronic component 100, but the present disclosure is not limited thereto.

Here, a thickness of the internal electrodes 121 and 122 may refer to an average thickness of the internal electrodes 121 and 122. The average thickness of the internal electrodes 121 and 122 may be measured by scanning cross-sections of the body 110 in the first direction and the second direction with a scanning electron microscope having a magnification of 10,000. More specifically, the average value may be measured by measuring the thicknesses at a plurality of points of one internal electrode, for example, at 30 points equally spaced in the second direction. In addition, when the average value is measured by extending the measurement of the average value to the plurality of internal electrodes, the average thickness of the internal electrodes may be further generalized.

The external electrodes 131 and 132 may include a first external electrode 131 connected to a plurality of first internal electrodes 121 and a second external electrode 132 connected to a plurality of second internal electrodes 122, and the first external electrode 131 and the second external electrode 132 may be disposed on both side surfaces of the body 110, for example, the third and fourth surfaces 3 and 4 opposing each other. In this case, the external electrodes 131 and 132 may partially extend to the first, second, fifth, and sixth surfaces 1, 2, 5, and 6 of the body 110, respectively.

From this point of view, the first external electrode 131 may include a first connection portion P1a disposed on the third surface 3 of the body 110 and a first band portion P1b extending from the first connection portion P1a to portions of the first, second, fifth, and sixth surfaces 1, 2, 5, and 6 of the body 110. Also, the second external electrode 132 may include a second connection portion P2a disposed on the fourth surface 4 of the body 110 and a second band portion P2b extending onto portions of the first, second, fifth, and sixth surfaces of the body 110 from the second connection portion P2a.

The external electrodes 131 and 132 may be formed of any material as long as they have electrical conductivity, such as metal, and specific materials may be determined in consideration of electrical characteristics and structural stability, and the external electrodes 131 and 132 may have a multilayer structure. For example, the external electrodes 131 and 132 may include first electrode layers 131a and 132a disposed on the body 110, second electrode layers 131b and 132b disposed on the first electrode layers 131a and 132a, and third electrode layers 131c and 132c disposed on the second electrode layers 131b and 132b.

The first electrode layers 131a and 132a may be, for example, fired electrodes including a conductive metal and glass. The conductive metal included in the first electrode layers 131a and 132a may include copper (Cu), nickel (Ni), palladium (Pd), platinum (Pt), gold (Au), silver (Ag), lead (Pb), and/or an alloy containing the same, and preferably, copper (Cu) and/or nickel (Ni), but is not limited thereto.

The first electrode layers 131a and 132a may be formed by dipping the third and fourth surfaces 3 and 4 of the body 110 in a conductive paste for external electrodes containing conductive metal and glass and then firing. Alternatively, the first electrode layers 131a and 132a may be formed by transferring a sheet including a conductive metal and glass.

The second electrode layers 131b and 132b may be, for example, resin-based electrodes including a conductive metal and a resin. As the conductive metal included in the second electrode layers 131b and 132b, a material having excellent electrical conductivity may be used, but is not particularly limited. For example, the conductive metal may include copper (Cu), nickel (Ni), palladium (Pd), platinum (Pt), gold (Au), silver (Ag), lead (Pb), and/or an alloy containing the same, and preferably, copper (Cu) and/or nickel (Ni), but is not limited thereto.

An insulating resin may be used as a resin included in the second electrode layers 131b and 132b, and is not particularly limited. For example, the resin may include an epoxy resin, but is not limited thereto. The second electrode layers 131b and 132b may be formed by applying and curing a paste including a conductive metal and a resin.

The third electrode layers 131c and 132c may improve mounting characteristics. A type of the third electrode layers 131c and 132c is not particularly limited and may be a plating layer including nickel (Ni), tin (Sn), palladium (Pd) and/or an alloy containing the same, and may be formed as a plurality of layers. The third electrode layers 131c and 132c may be, for example, a nickel (Ni) plating layer or a tin (Sn) plating layer, or may have a form in which a nickel (Ni) plating layer and a tin (Sn) plating layer are sequentially formed. Also, the third electrode layers 131c and 132c may include a plurality of nickel (Ni) plating layers and/or a plurality of tin (Sn) plating layers.

In the drawings, a structure in which the ceramic electronic component 100 has two external electrodes 131 and 132 is described, but the present disclosure is not limited thereto and the number or shape of the external electrodes 131 and 132 may be changed according to a shape of the internal electrodes 121 and 122 or for other purposes.

The insulating layer 150 may prevent an occurrence of cracks by preventing a stress inside the body 110 during mounting on a substrate, and may improve bending strength of the ceramic electronic component 100. In addition, the insulating layer 150 may prevent penetration of external moisture, thereby improving moisture resistance reliability. In addition, even when a high voltage is applied, the insulating layer 150 may prevent electrical breakdown of surface to improve surface insulation.

The insulating layer 150 may cover the external electrodes 131 and 132. For example, the insulating layer 150 may cover the first surface of the body 110 and cover the first and second external electrodes 131 and 132 extending onto a portion of the first surface 1 of the body 110. For example, the insulating layer 150 may be disposed on the first surface 1 of the body 110 and may extend onto the first band portion P1b extending onto the first surface 1 of the body 110 and the second band portion P2b extending onto the first surface 1 of the body 110.

The insulating layer 150 may include a plurality of openings H1 and H2 exposing the external electrodes 131 and 132. More specifically, the insulating layer 150 may include a plurality of first openings H1 exposing the first external electrode 131 and a plurality of second openings H2 exposing the second external electrodes 132.

The shapes of the openings H1 and H2 are not particularly limited. That is, although the cross-sections of the openings H1 and H2 are shown to be circular in the drawing, for example, they may have a shape such as a quadrangle, an oval, or a quadrangle with rounded corners, or may have an irregular shape. The openings H1 and H2 may be formed by, for example, irradiating a laser to the insulating layer 150 or may be formed through a photolithography process, but the present disclosure is not limited thereto.

In this case, a ratio of an area of the plurality of openings H1 and H2 to an area S of the surfaces of the external electrodes 131 and 132 covered by the insulating layer 150 may satisfy 20% to 70%. More specifically, the ratio of the area of the plurality of first openings H1 to the area S of the surface of the first external electrode 131 covered by the insulating layer 150 may satisfy 20% to 70%, and the ratio of the area of the plurality of second openings H2 to the area S of the surface of the second external electrode 132 covered by the insulating layer 150 may satisfy 20% to 70%.

Here, the area S of the surfaces of the external electrodes 131 and 132 covered by the insulating layer 150 may refer to the sum of the area in which the insulating layer 150 is disposed on the first external electrode 131 and the area of the plurality of first openings H1. Alternatively, the area S covered by the insulating layer 150 may refer to the sum of the area in which the insulating layer 150 is disposed on the second external electrode 132 and the area of the plurality of second openings H2.

As the ratio of the area of the plurality of openings H1 and H2 to the area S of the surfaces of the external electrodes 131 and 132 covered by the insulating layer 150 satisfies 20% to 70%, the bending strength of the ceramic electronic component 100 may be improved, and since the external electrodes 131 and 132 and the conductive adhesive are connected through the plurality of openings H1 and H2 during mounting, adhesive strength of the ceramic electronic component 100 during mounting may be improved and a length of a current path is reduced to improve ESL characteristics.

If the ratio of the area of the plurality of openings H1 and H2 to the area S of the surfaces of the external electrodes 131 and 132 covered by the insulating layer 150 is less than 20%, the bending strength may be improved, but the external electrodes 131 and 132 and the conductive adhesive may not be sufficiently connected to each other, so that the bending strength may be reduced.

If the ratio of the area of the plurality of openings H1 and H2 to the area S of the surfaces of the external electrodes 131 and 132 covered by the insulating layer 150 is greater than 70%, the external electrodes 131 and 132 and the conductive adhesive may be sufficiently connected through the openings H1 and H2, thereby improving adhesive strength, but since the insulating layer 150 is not sufficiently formed on the surfaces of the external electrodes 131 and 132, the bending strength may be lowered.

The insulating layer 150 may include a material having electrical insulating properties, and the material is not particularly limited. For example, the insulating layer 150 may include at least one of a resin or ceramics. For example, the insulating layer 150 may include a resin, ceramics, or a mixture thereof. The resin may include, for example, an epoxy resin, a silicone resin, a fluorine resin, a phenol resin, a urea resin, a melamine resin, and/or an unsaturated polyester resin, but is not limited thereto. Ceramics may include, but are not limited to, lead zirconate titanate, alumina, silica, silicon carbide, and/or magnesium oxide.

Figure 1:
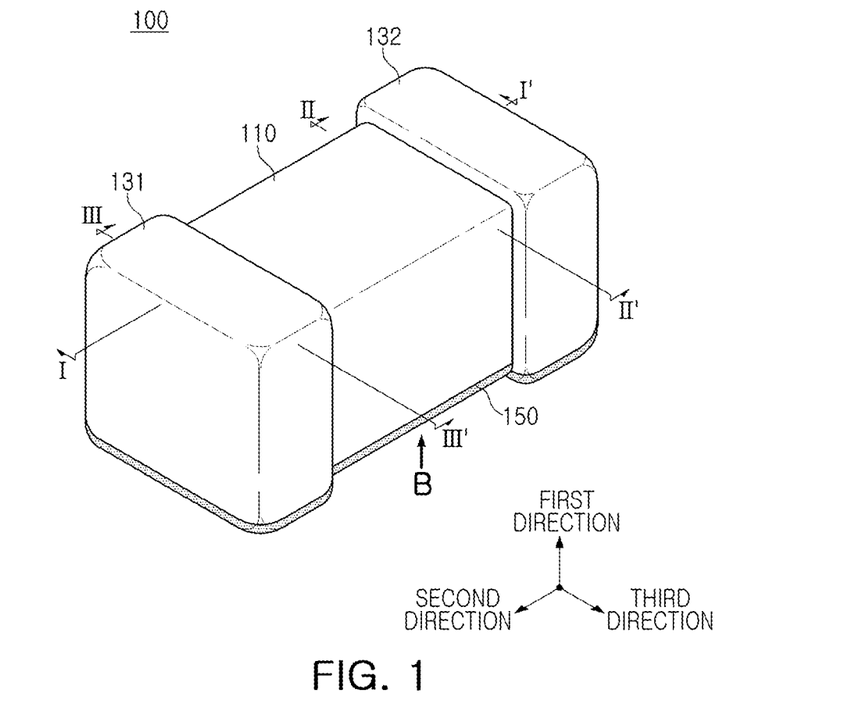
FIG. 1 is a schematic perspective view of a ceramic electronic component according to an exemplary embodiment in the present disclosure.
Figure 2:
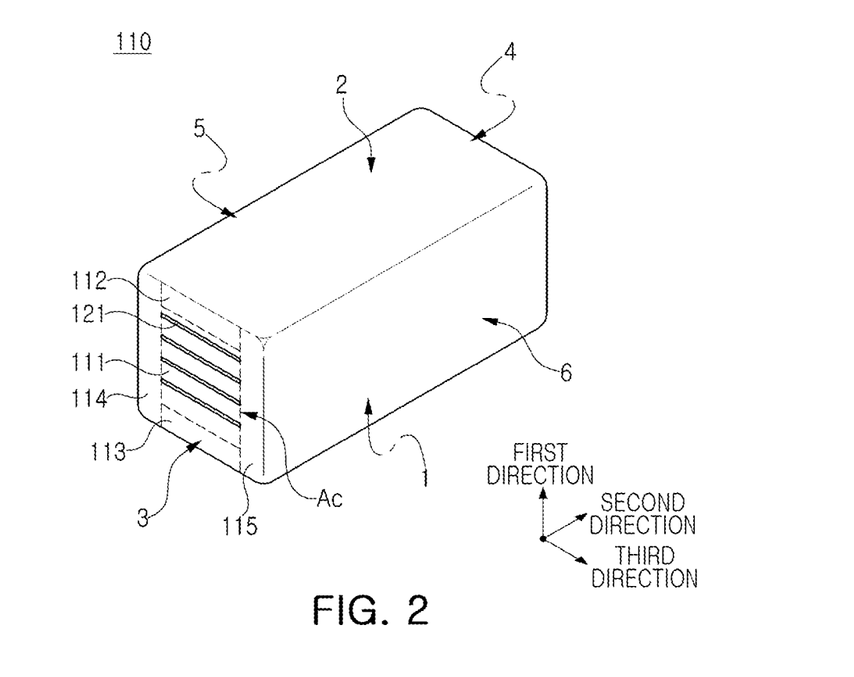
FIG. 2 is a schematic perspective view of a body of the ceramic electronic component of FIG. 1.
Figure 3:
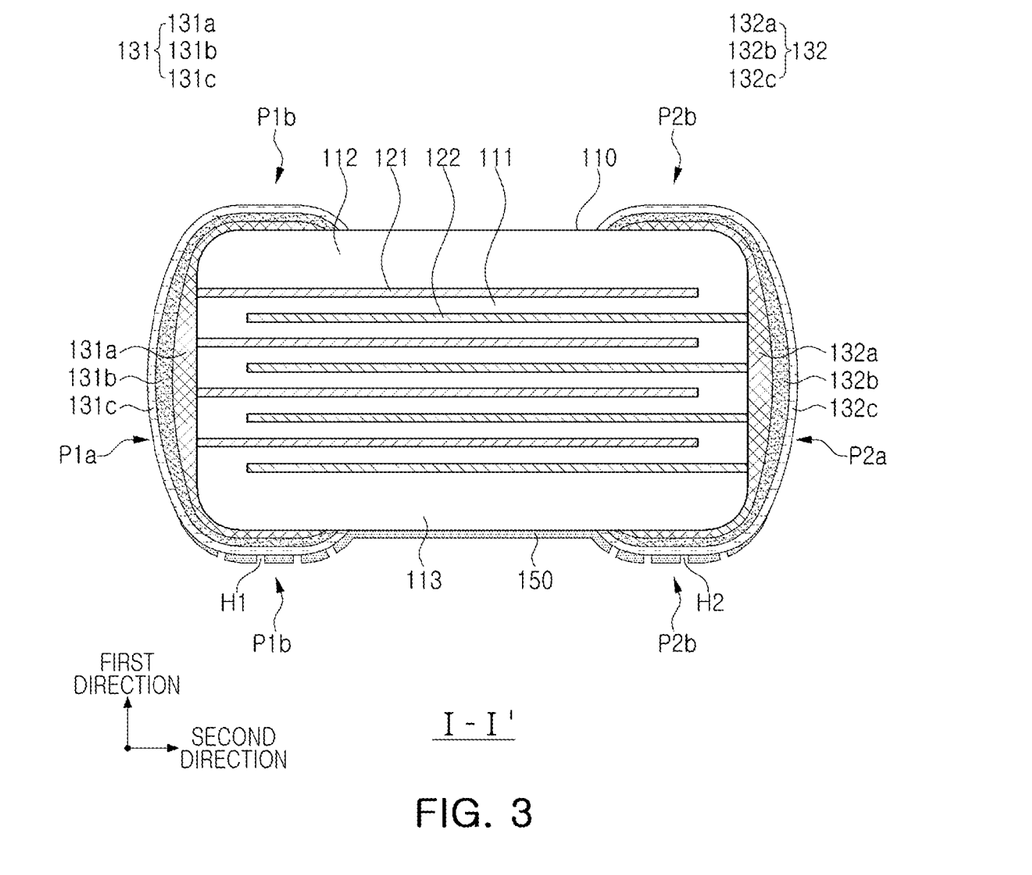
FIG. 3 is a cross-sectional view schematically illustrating a cross-section I-I' of FIG. 1.
Figure 4:
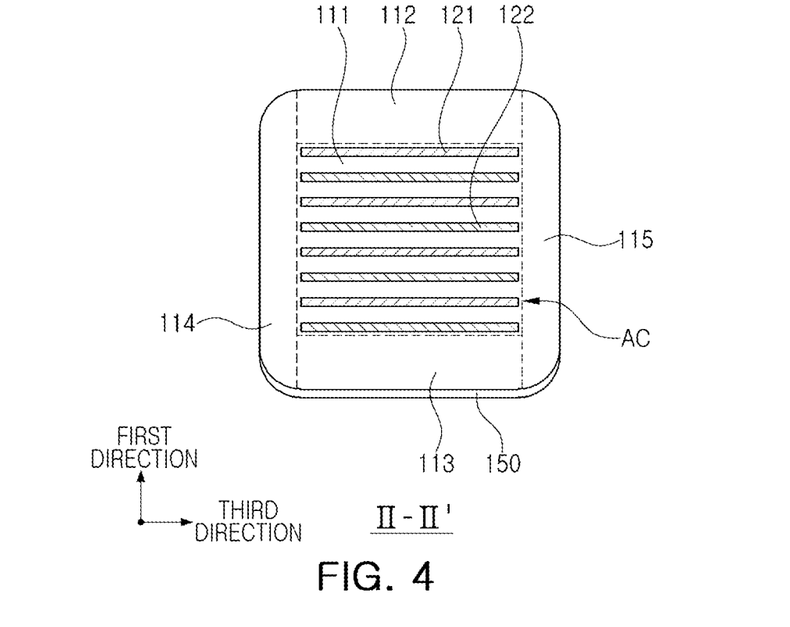
FIG. 4 is a cross-sectional view schematically illustrating a cross-section II-II' of FIG. 1.
Figure 5:
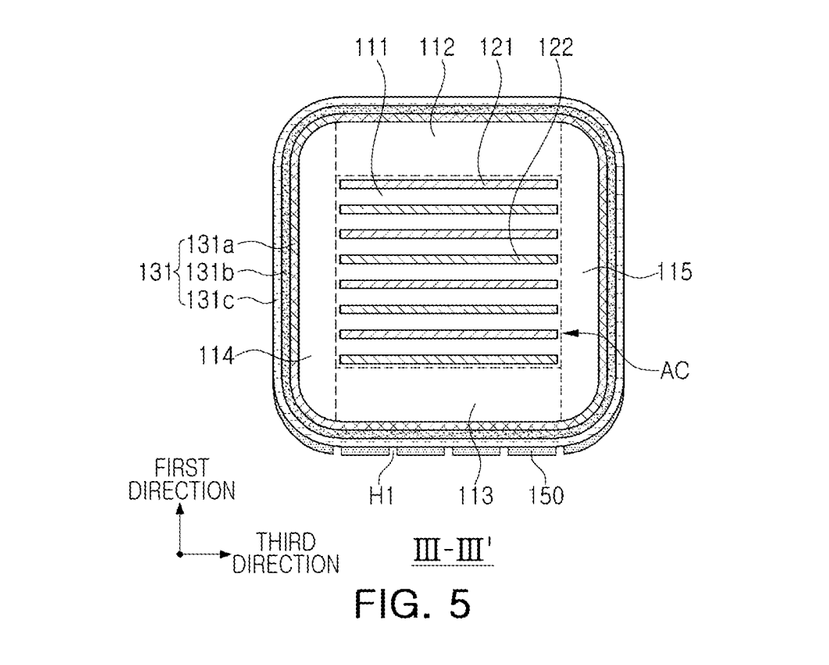
FIG. 5 is a cross-sectional view schematically illustrating a cross-section III-III' of FIG. 1.
Figure 6:
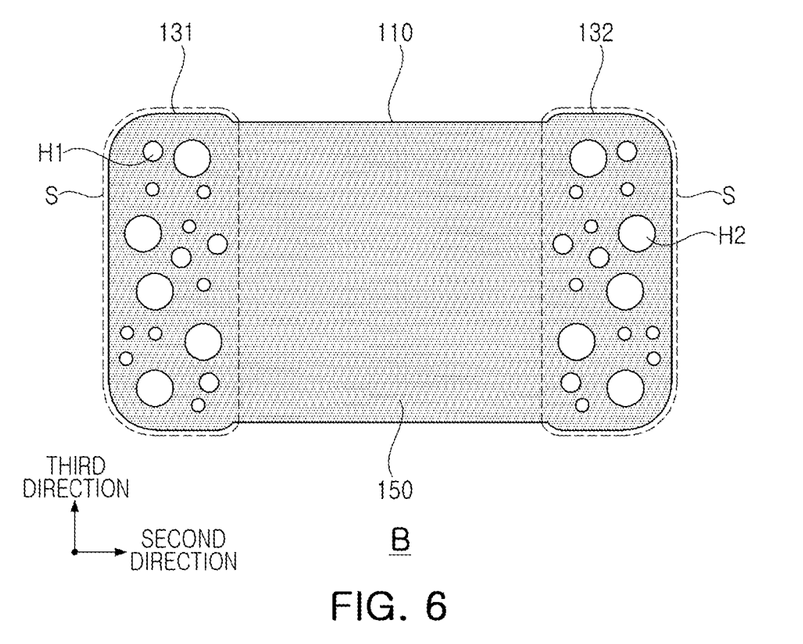
FIG. 6 is a plan view viewed in direction B of FIG. 1.
Figure 7:
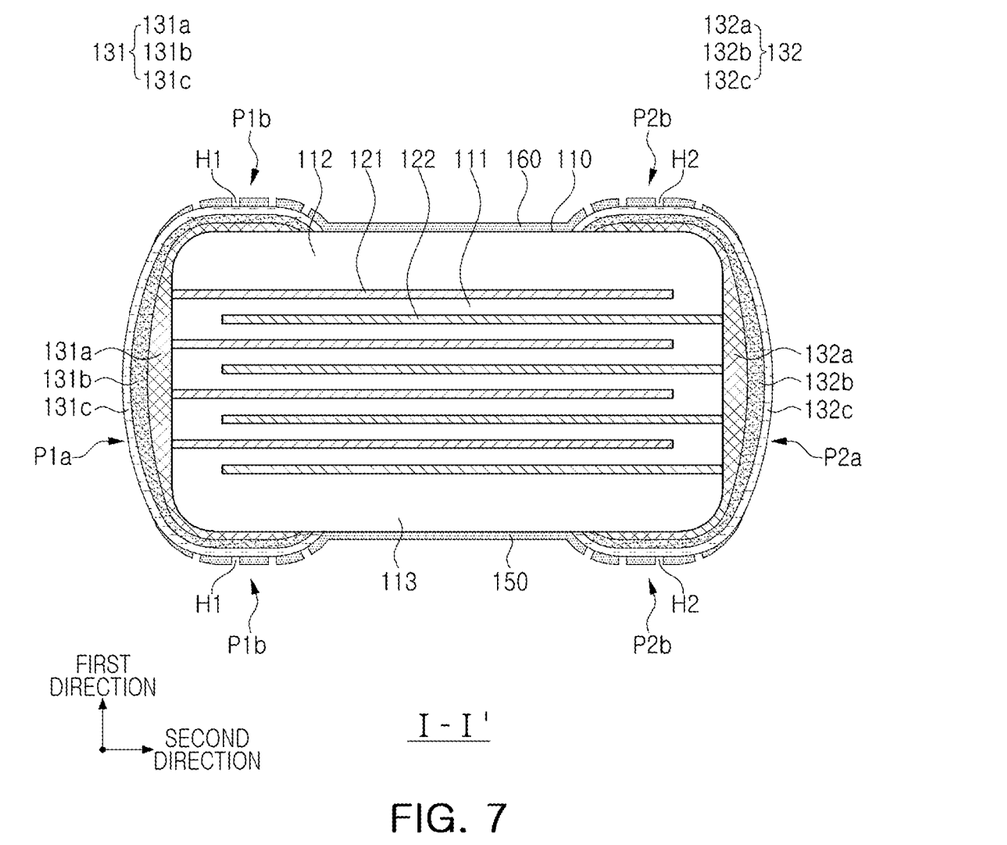
FIG. 7 is a cross-sectional view schematically illustrating a cross-section of I-I' of FIG. 1 according to an exemplary embodiment in the present disclosure.

In an exemplary embodiment in the present disclosure, the ceramic electronic component 100 may further include an additional insulating layer 160 covering the second surface 2 of the body 110 and the first and second external electrodes extending onto portions of the second surface 2 of the body 110. By further including the additional insulating layer 160, the bending strength of the ceramic electronic component 100 may be more effectively improved. In this case, the additional insulating layer 160 may include a plurality of first openings H1 exposing the first external electrode 131 and a plurality of second openings H2 exposing the second external electrode 132. In this manner, mounting convenience may be secured.

Figure 8:
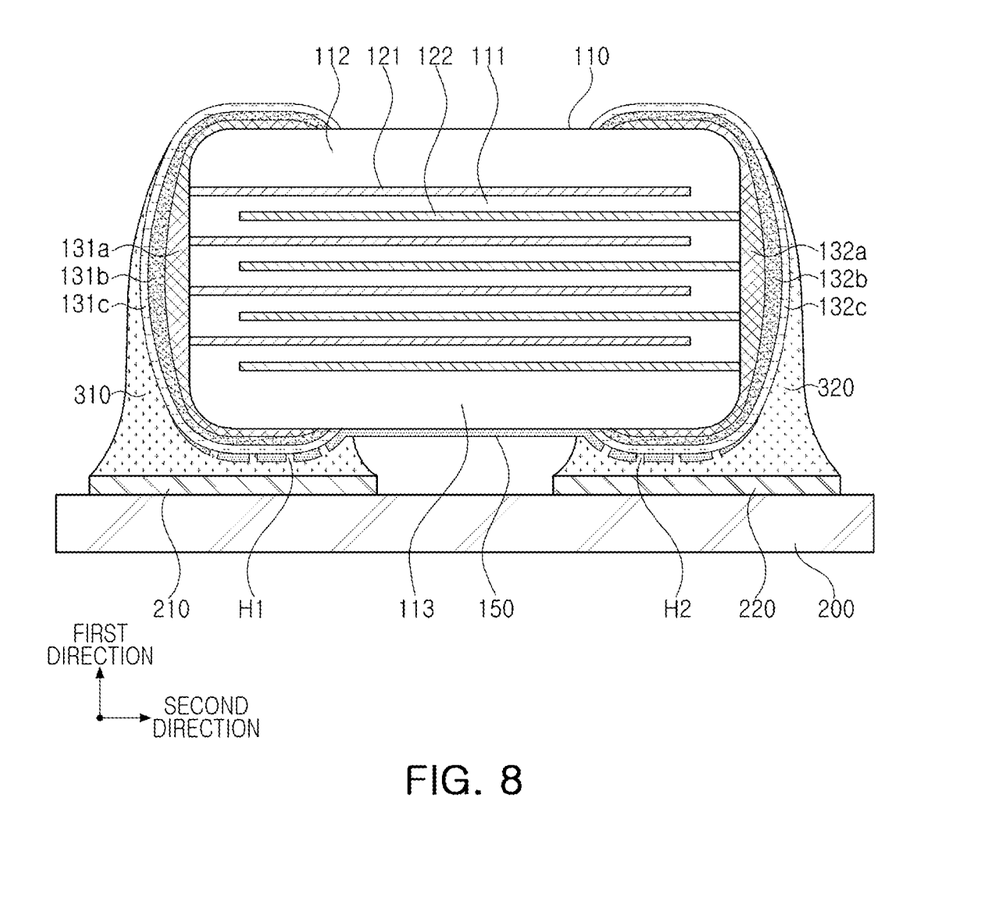
FIG. 8 is a cross-sectional view schematically illustrating a ceramic electronic component mounted on a substrate.

Referring to FIG. 8, the ceramic electronic component 100 according to an exemplary embodiment in the present disclosure is mounted on electrode pads 210 and 220 of a PCB 200 through conductive adhesives 310 and 320 such as solder. In this case, the bending strength of the ceramic electronic component 100 may be improved through the insulating layer 150, and as the external electrodes 131 and 132 are connected to the conductive adhesives 310 and 320 through the plurality of openings H1 and H2, the fixing strength and ESL characteristics may be improved.

Example

The ceramic electronic component 100 including external electrodes 131 and 132 including first electrode layers 131a and 132a which are fired electrodes including copper (Cu), second electrode layers 132a and 132b which are resin electrodes including copper (Cu), and third electrode layers 131c and 132c including a nickel (Ni) plating layer and a tin (Sn) plating layer was prepared.

Thereafter, the insulating layer 150 covering the first surface 1 of the body 110 and external electrodes 131 and 132 extending onto a portion of the first surface of the body 110 was formed, and then, a photolithography process was executed to form a plurality of openings H1 and H2 exposing the external electrodes 131 and 132 on the insulating layer 150.

<Measurement of Area Ratio of Opening>

In order to measure the ratio of the area of the plurality of openings H1 and H2 to the area S of the surface of the external electrodes 131 and 132 covered by the insulating layer 150, a lower surface of the ceramic electronic component 100 was imaged with a scanning electron microscope (SEM).

Thereafter, scanning electron microscope (SEM) images were analyzed through energy dispersive X-ray spectroscopy (EDS). Here, in the insulating layer 150 covering the external electrodes 131 and 132, the region in which the insulating layer 150 is formed and the region in which the openings H1 and H2 are formed may be distinguished from each other due to a difference in components included in each region. This is because the insulating layer 150 includes ceramics and/or resin, and the third electrode layers 131c and 132c exposed through the openings H1 and H2 include a conductive metal. In addition, the region in which the insulating layer 150 is formed and the region in which the openings H1 and H2 are formed may be distinguished from each other by performing EDS analysis on a back scattered electron (BSE) image of the SEM, enabling relative contrast comparison. Other measurement methods and/or tools appreciated by one of ordinary skill in the art, even if not described in the present disclosure, may also be used.

Thereafter, the ratio of the area of the plurality of first openings H1 to the area of the surface of the first external electrode 131 covered by the insulating layer 150 was measured. The area ratio may be obtained by converting the BSE image into an image in which contrast and color are relatively compared based on pixels and measuring an area of the region in which the insulating layer 150 is disposed and an area of the region in which the first openings H1 are disposed through a program in the EDS.

The area covered of the surface of the first external electrode 131 by the insulating layer 150 is the sum of the area in which the insulating layer 150 is disposed on the first external electrode 131 and the area in which the plurality of first openings H1 are disposed. Thereafter, a ratio of the area of the plurality of first openings H1 to the area of the surface of the first external electrode 131 covered by the insulating layer 150 was measured. Similarly, a ratio of the area of the plurality of second openings H2 to the area of the surface of the second external electrode 132 covered by the insulating layer 150 was measured. Thereafter, average values of the area ratio of the first openings H1 and the area ratio of the second openings H2 were measured from 30 sample chips for each sample number and then averaged and described in Table 1.

<Bending Strength and Adhesive Strength>

Bending strength was measured using a method of measuring bending strength through a piezoelectric effect. After the sample chips were mounted on the board with tin (Sn) solder, a distance from the center that is pressed during bending was set to 5 mm to see if cracks occur in the sample chips, and the number of sample chips in which cracks occurred among 60 sample chips for each sample number is listed in Table 1.

For the adhesive strength, after the sample chips were mounted on a substrate with tin (Sn) solder and then a force was applied in a direction parallel to the substrate, and a case in which a chip was damaged when the applied force was 18 N or less was determined as defective adhesive strength. Here, the number of sample chips in which defective adhesive strength occurred, among 30 sample chips for each sample number is described in Table 1.

TABLE 1

| Sample No. | Area ratio (%) | Bending strength | Adhesive strength |
|---|---|---|---|
| 1* | 0 | 0/60 | 14/30 |
| 2* | 5 | 0/60 | 9/30 |
| 3* | 10 | 0/60 | 8/30 |
| 4* | 15 | 0/60 | 3/30 |
| 5 | 20 | 0/60 | 0/30 |
| 6 | 25 | 0/60 | 0/30 |
| 7 | 30 | 0/60 | 0/30 |
| 8 | 40 | 0/60 | 0/30 |
| 9 | 50 | 0/60 | 0/30 |
| 10 | 60 | 0/60 | 0/30 |
| 11 | 65 | 0/60 | 0/30 |
| 12 | 70 | 0/60 | 0/30 |
| 13* | 75 | 2/60 | 0/30 |
| 14* | 80 | 3/60 | 0/30 |

*is Comparative Example

Referring to Table 1, sample Nos. 5 to 12 showed that the ratio of the area of the plurality of openings to the area of the surface of the external electrode covered by the insulating layer satisfies 20% to 70%, so that both bending strength and adhesive strength are excellent.

Referring to sample Nos. 1* to 4*, it can be seen that the area ratio is less than 20% and the external electrode and the tin solder are not sufficiently connected, so that the adhesive strength is lowered. In addition, referring to sample Nos. 13* and 14*, it can be seen that the area ratio exceeds 70% and the insulating is not sufficiently formed, so that the bending strength is lowered.

As set forth above, as one of various effects of the present disclosure, cracks that may occur during substrate mounting may be prevented and a ceramic electronic component having excellent bending strength may be provided.

As one of various effects of the present disclosure, a ceramic electronic component having excellent adhesive strength to a substrate may be provided.

As one of various effects of the present disclosure, a ceramic electronic component having excellent ESL characteristics by reducing a length of a current path may be provided.

While exemplary embodiments have been shown and described above, it will be apparent to those skilled in the art that modifications and variations could be made without departing from the scope of the present disclosure as defined by the appended claims.

What is claimed is:

1. A ceramic electronic component comprising:
a body including a dielectric layer and a plurality of internal electrodes stacked in a first direction with the dielectric layer interposed therebetween and including first and second surfaces opposing each other in the first direction and side surfaces connected to the first and second surfaces;
an external electrode disposed on one of the side surfaces of the body and extending onto a portion of the first surface of the body; and
an insulating layer covering a surface of the external electrode and including a plurality of openings exposing the external electrode,
wherein a ratio of an area of the plurality of openings to an area of the surface of the external electrode covered by the insulating layer is 20% to 70%,
the external electrode includes a first electrode layer disposed on the body, a second electrode layer disposed on the first electrode layer, and a third electrode layer disposed on the second electrode layer,
the insulating layer is disposed on the first surface of the body and an outer surface of the third electrode layer, such that the plurality of openings of the insulating layer expose the third electrode layer, and
at least two openings among the plurality of openings have different sizes from each other.

2. The ceramic electronic component of claim 1, wherein the insulating layer covers the first surface of the body and the external electrode extending onto the portion of the first surface of the body.

3. The ceramic electronic component of claim 2, wherein the external electrode includes first and second external electrodes disposed on two side surfaces of the body opposing each other, and
the insulating layer covers each of the first and second external electrodes extending onto a portion of the first surface of the body.

4. The ceramic electronic component of claim 3, further comprising an additional insulating layer covering the second surface of the body and each of the first and second external electrodes extending onto a portion of the second surface of the body.

5. The ceramic electronic component of claim 1, wherein the first electrode layer includes a conductive metal and glass, the second electrode layer includes a conductive metal and a resin, and the third electrode layer includes a conductive metal.

6. The ceramic electronic component of claim 5, wherein the conductive metal of the first electrode layer includes copper (Cu) or nickel (Ni), the conductive metal of the second electrode layer includes copper (Cu) or nickel (Ni), and the resin of the second electrode layer includes an epoxy resin.

7. The ceramic electronic component of claim 5, wherein the third electrode layer has a multilayer structure including a first layer including nickel (Ni) as a conductive metal and a second layer including tin (Sn) as a conductive metal.

8. The ceramic electronic component of claim 1, wherein the insulating layer includes at least one of a resin or a ceramic.

9. The ceramic electronic component of claim 8, wherein the resin includes at least one of an epoxy resin, a silicon resin, a fluoro resin, a phenol resin, a urea resin, a melamine resin, or an unsaturated polyester resin.

10. The ceramic electronic component of claim 8, wherein the ceramic includes at least one of lead zirconate titanate, alumina, silica, silicon carbide, or magnesium oxide.

11. A ceramic electronic component comprising:
a body including a dielectric layer and a plurality of internal electrodes stacked in a first direction with the dielectric layer interposed therebetween and including first and second surfaces opposing each other in the first direction and side surfaces connected to the first and second surfaces;
first and second external electrodes respectively disposed on both of the side surfaces of the body opposing each other; and
an insulating layer covering the first surface of the body, the first external electrode extending onto a portion of the first surface of the body, and the second external electrode extending onto another portion of the first surface of the body,
wherein the insulating layer includes a plurality of openings exposing the first and second external electrodes,
the first and second external electrodes each include a first electrode layer disposed on the body, a second electrode layer disposed on the first electrode layer, and a third electrode layer disposed on the second electrode layer,
the insulating layer is disposed on the first surface of the body and an outer surface of the third electrode layer, such that the plurality of openings of the insulating layer expose the third electrode layer, and
at least two openings among the plurality of openings have different sizes from each other.

12. The ceramic electronic component of claim 11, wherein the first electrode layer of each of the first and second external electrodes includes a conductive metal and glass, the second electrode layer of each of the first and second external electrodes includes a conductive metal and a resin, and the third electrode layer of each of the first and second external electrodes includes a conductive metal.

13. The ceramic electronic component of claim 12, wherein the third electrode layer of each of the first and second external electrodes has a multilayer structure including a first layer including nickel (Ni) as a conductive metal and a second layer including tin (Sn) as a conductive metal.

14. A ceramic electronic component comprising:
a body including a dielectric layer and a plurality of internal electrodes stacked in a first direction with the dielectric layer interposed therebetween and including first and second surfaces opposing each other in the first direction and side surfaces connected to the first and second surfaces;
an external electrode including a connection portion disposed on one of the side surfaces of the body and a band portion extending from the connection portion onto a portion of the first surface of the body; and
an insulating layer disposed on the first surface of the body and extending onto a portion of the band portion of the external electrode, the insulating layer including at least one opening exposing the portion of the band portion,
wherein the external electrode includes a first electrode layer disposed on the body, a second electrode layer disposed on the first electrode layer, and a third electrode layer disposed on the second electrode layer,
the insulating layer is disposed on the first surface of the body and an outer surface of the third electrode layer, such that the at least one opening of the insulating layer expose the third electrode layer, and
at least two openings among the plurality of openings have different sizes from each other.

15. The ceramic electronic component of claim 14, wherein the insulating layer does not extend onto the one of the side surfaces.

16. The ceramic electronic component of claim 14, wherein the insulating layer includes a plurality of openings exposing the portion of the band portion, and a ratio of an area of the plurality of openings to an area of the portion of the band portion covered by the insulating layer is 20% to 70%.

17. The ceramic electronic component of claim 14, wherein a portion of the insulating layer directly disposed on the first surface of the body is free of openings.

18. The ceramic electronic component of claim 14, wherein
the external electrode includes first and second external electrodes including first and second connection portions disposed on two side surfaces of the body opposing each other,
respectively and first and second band portions extending toward each other to be disposed onto portions of the first surface of the body, and
the insulating layer extends onto the first and second band portions and includes a plurality of openings exposing portions of the first and second band portions.

19. The ceramic electronic component of claim 18, further comprising an additional insulating layer covering the second surface of the body and each of the first and second external electrodes extending onto a portion of the second surface of the body.

20. The ceramic electronic component of claim 18, wherein the ceramic electronic component is mounted on electrode pads of a PCB through conductive adhesives, and
the conductive adhesives connect the first and second external electrodes to the electrode pads through the plurality of openings.

* * * * *